US008363172B2

(12) United States Patent
Chono et al.

(10) Patent No.: US 8,363,172 B2
(45) **Date of Patent: *Jan. 29, 2013**

(54) LIQUID CRYSTAL MOTOR MAKING USE OF FLOW OF LIQUID CRYSTAL

(75) Inventors: Shigeomi Chono, Kochi (JP); Tomohiro Tsuji, Kami-gun (JP)

(73) Assignee: Kochi University of Technology, Kami-gun, Kochi (JP)

( * ) Notice: Subject to any disclaimer, the term of this patent is extended or adjusted under 35 U.S.C. 154(b) by 121 days.

This patent is subject to a terminal disclaimer.

(21) Appl. No.: 12/887,750

(22) Filed: Sep. 22, 2010

(65) Prior Publication Data

US 2011/0058114 A1 Mar. 10, 2011

Related U.S. Application Data

(60) Division of application No. 10/814,110, filed on Mar. 30, 2004, now Pat. No. 7,826,029, which is a continuation of application No. PCT/JP02/10129, filed on Sep. 27, 2002.

(30) Foreign Application Priority Data

Oct. 1, 2001 (JP) ................................ 2001-305581

(51) Int. Cl.
*G02F 1/13* (2006.01)
*G02F 1/1343* (2006.01)
*G02F 1/1337* (2006.01)

(52) U.S. Cl. ............................ 349/1; 349/139; 349/191

(58) Field of Classification Search .................. 349/191, 349/1, 33–35, 139

See application file for complete search history.

(56) References Cited

U.S. PATENT DOCUMENTS

| | | | | |
|---|---|---|---|---|
| 7,324,182 | B2 * | 1/2008 | Chono et al. | 349/126 |
| 2002/0063829 | A1 | 5/2002 | Manabe et al. | |
| 2003/0160913 | A1 | 8/2003 | Yamashita | |
| 2005/0134778 | A1 | 6/2005 | Tsuboi et al. | |

FOREIGN PATENT DOCUMENTS

| | | |
|---|---|---|
| JP | 06-046584 | 2/1994 |
| JP | 3005263 | 5/1994 |
| JP | 08-270615 | 10/1996 |
| JP | 11-230023 | 8/1999 |
| JP | 2001-013895 | 1/2001 |
| JP | 2001-260100 | 9/2001 |

OTHER PUBLICATIONS

PCT/JP02/10129, English translation of Japanese examiner's comments.

* cited by examiner

*Primary Examiner* — Dung T. Nguyen

(74) *Attorney, Agent, or Firm* — Weaver Austin Villeneuve & Sampson LLP

(57) ABSTRACT

A liquid crystal motor, which makes use of the flow of liquid crystal, is provided. A mechanism for causing a flow of liquid crystal comprising (i) a channel "L" defined by at least one wall surface "B," (ii) liquid crystal "LC" which is put in the channel "L" and movable along said at least one wall surface "B", and (iii) a means for turning the molecules "m" of the liquid crystal "LC" in a plane intersecting said at least one wall surface "B." The mechanism makes use of the flow of the liquid crystal "LC" which is caused when the molecules "m" of the liquid crystal "LC" are turned. When the means for turning the molecules "m" of the liquid crystal "LC" turns the molecules "m" of the liquid crystal "LC" in a plane intersecting said at least one wall surface "B," the liquid crystal "LC" flows along said at least one wall surface "B." The flow of the liquid crystal "LC" can easily be utilized for making object-moving devices, sensors, actuators, etc.

8 Claims, 9 Drawing Sheets

(A)

(B)

(C)

(A)

(B)

(A)

(B)

(C)

(A)

(B)

(C)

LIQUID CRYSTAL MOTOR MAKING USE OF FLOW OF LIQUID CRYSTAL

This is a divisional of application Ser. No. 10/814,110 filed Mar. 30, 2004, currently pending.

BACKGROUND OF THE INVENTION

This invention relates to a liquid crystal motor, which makes use of the flow of liquid crystal, and a mechanism and a method for causing a flow of liquid crystal. Liquid crystal is fluid, but optically anisotropic, causes birefringence, and has crystal-like properties. When an electric or magnetic field is applied to liquid crystal, all its molecules turn about their centers of gravity in one and the same direction and their axes are arranged at a certain peculiar angle with the direction of electric or magnetic force. This invention relates to a mechanism and a method for causing a flow of liquid crystal and an object-moving mechanism which take advantage of such properties of liquid crystal.

Liquid crystal has been used to make information-showing devices such as liquid-crystal displays because changes in the orientation of its molecules change its optical properties.

Besides, when an electric or magnetic field is applied to liquid crystal to change the direction of orientation of its molecules, its viscosity changes. Namely, it is an electrorhological fluid. Accordingly, liquid crystal has been used to make bearing, dampers, etc., too.

On the other hand, it is known that a flow of liquid crystal occurs at the time of reorientation of molecules of liquid crystal. For example, as shown in FIG. 9, liquid crystal is put between two fixed parallel plates "P" and "P" and its molecule axes are arranged in parallel with the plates "P" and "P." Then, when an electric field, of which the direction of electric force is perpendicular to the plates "P" and "P," is applied to the liquid crystal, its molecules turn, which causes the liquid crystal to flow. Thus, electric energy can be transformed into kinetic energy by using liquid crystal.

So far, however, nobody has tried to make industrial use of the kinetic energy of molecules, or the flow, of liquid crystal; accordingly, there is no method or device for making positive use of the flow of liquid crystal.

Under the circumstances, the object of the present invention is to provide a mechanism and a method for causing a flow of liquid crystal, which can be utilized industrially, and a liquid crystal motor, which makes use of the flow of liquid crystal.

SUMMARY OF THE INVENTION

According to the first feature of the present invention, there is provided a mechanism for causing a flow of liquid crystal, which comprises (i) a channel defined by at least one wall surface, (ii) liquid crystal which is put in the channel and movable along said at least one wall surface, and (iii) a means for applying an electric or magnetic field to the molecules of the liquid crystal to turn them in a plane intersecting said at least one wall surface. The means includes a sub-means for twisting the molecules about an axis intersecting said at least one wall surface and restricting the molecules so that they will turn in one and the same direction.

According to the second feature of the present invention, there is provided the mechanism for causing a flow of liquid crystal of the first feature. The channel is defined by a pair of wall surfaces facing each other and the liquid crystal is put between the paired wall surfaces. The sub-means has a pair of orientation films, either of the paired wall surface being fitted with one orientation film, the surfaces of the orientation films being rubbed in the same direction.

According to the third feature of the present invention, there is provided the mechanism for causing a flow of liquid crystal of the first feature. The channel is defined by a pair of wall surfaces facing each other and the liquid crystal is put between the paired wall surfaces. The sub-means has a pair of orientation films, either of the paired wall surface being fitted with one orientation film, the rubbing direction of the surface of one orientation film being at an angle with the rubbing direction of the surface of the other orientation film.

According to the fourth feature of the present invention, there is provided the mechanism for causing a flow of liquid crystal of the first feature. The molecules of the liquid crystal are tilted relatively to the wall surface or one of the paired wall surfaces.

According to the fifth feature of the present invention, there is provided the mechanism for causing a flow of liquid crystal of the first feature. The means includes a controller to control the timing in applying an electric or magnetic field to the liquid crystal and the intensity of the electric or magnetic field, and the controller applies an electric or magnetic field to the liquid crystal intermittently.

According to the sixth feature of the present invention, there is provided a liquid crystal motor, which comprises (i) a fixed lower member, (ii) a movable upper member of which the lower surface faces the upper surface of the fixed lower member and which is movable along the upper surface of the fixed lower member, (iii) liquid crystal put between the upper surface of the fixed lower member and the lower surface of the movable upper member, and (iv) a means for applying an electric field to the molecules of the liquid crystal to turn them in a plane intersecting the upper surface of the fixed lower member. The means includes (i) a pair of electrodes, one being fitted to the fixed lower member, the other being fitted to the movable upper member and (ii) a sub-means which is fitted onto the fix lower and movable upper members and restricts the molecules of the liquid crystal so that they will turn in one and the same direction.

According to the seventh feature of the present invention, there is provided a liquid crystal motor, which comprises (i) a fixed lower member, (ii) a movable upper member of which the lower surface faces the upper surface of the fixed lower member and which is movable along the upper surface of the fixed lower member, (iii) liquid crystal put between the upper surface of the fixed lower member and the lower surface of the movable upper member, and (iv) a means for applying a magnetic field to the molecules of the liquid crystal to turn them in a plane intersecting the upper surface of the fixed lower member. The means includes (i) a pair of magnetic poles, one being fitted to the fixed lower member, the other being fitted to the movable upper member and (ii) a sub-means which is fitted onto the fix lower and movable upper members and restricts the molecules of the liquid crystal so that they will turn in one and the same direction.

According to the eighth feature of the present invention, there is provided the liquid crystal motor of the sixth or seventh feature. The sub-means has a pair of rubbed orientation films, one being fitted onto the upper surface of the fixed lower member, the other being fitted onto the lower surface of the movable upper member.

According to the ninth feature of the present invention, there is provided the object-moving mechanism of the sixth or seventh feature. The sub-means twists the liquid crystal between the upper surface of the fixed lower member and the lower surface of the movable upper member.

According to the tenth feature of the present invention, there is provided a liquid crystal motor, which comprises (i) an outer member which has a space in it, (ii) a shaft which is put in the space for free rotation, (iii) liquid crystal which is put between the inside surface of the outer member and the surface of the shaft, and (iv) a means for applying a radial electric field to the molecules of the liquid crystal to turn them in a plane intersecting the axis of the shaft. The means includes (i) a pair of electrodes, one being fitted to the outer member, the other being fitted to the shaft and (ii) a sub-means which is fitted onto the outer member and the shaft and restricts the molecules of the liquid crystal so that they will turn in one and the same direction.

According to the eleventh feature of the present invention, there is provided a liquid crystal motor, which comprises (i) an outer member which has a space in it, (ii) a shaft which is put in the space for free rotation, (iii) liquid crystal which is put between the inside surface of the outer member and the surface of the shaft, and (iv) a means for applying a radial magnetic field to the molecules of the liquid crystal to turn them in a plane intersecting the axis of the shaft. The means includes (i) a pair of magnetic poles, one being fitted to the outer member, the other being fitted to the shaft and (ii) a sub-means which is fitted onto the outer member and the shaft and restricts the molecules of the liquid crystal so that they will turn in one and the same direction.

According to the twelfth feature of the present invention, there is provided the liquid crystal motor of the tenth or eleventh feature. The sub-means has an orientation film laid on the inside surface of the outer member and an orientation film laid on the surface of the shaft. The orientation film of the outer member is rubbed in the direction at an angle with the axis of the shaft, and the orientation film of the shaft is rubbed in the direction at an angle with the axis of the shaft.

According to the thirteenth feature of the present invention, there is provided the liquid crystal motor of the tenth or eleventh feature. The sub-means twists the liquid crystal between the inside surface of the outer member and the surface of the shaft.

According to the fourteenth feature of the present invention, there is provided a liquid crystal motor, which comprises (i) an outer member which has an inner space defined by a pair of horizontal upper and lower wall surfaces; (ii) an inner member which is put in the space to divide it into right and left subspaces and movable right and left along the upper and lower wall surfaces, (iii) liquid crystal which is put in the space, and (iv) a means for applying an electric or magnetic field to the molecules of the liquid crystal to turn them in one and the same direction in a plane intersecting the inside of the outer member. The means includes a sub-means for twisting the liquid crystal about an axis intersecting one of the paired wall surfaces and restricting the molecules of the liquid crystal so that those in the right sub-space will turn in one direction and those in the left sub-space will turn in the opposite direction.

According to the fifteenth feature of the present invention, there is provided the liquid crystal motor of the fourteenth feature. The sub-means has a pair of orientation films, either of the upper and lower wall surface being fitted with one orientation film, the parts of the upper and lower orientation films on the right side of the inner members being rubbed from the left to the right, the parts of the upper and lower orientation films on the left side of the inner members being rubbed from the right to the left.

According to the sixteenth feature of the present invention, there is provided the liquid crystal motor of the sixth, seventh, tenth, eleventh, fourteenth feature. The means includes a controller to control the timing in applying an electric or magnetic field to the liquid crystal and the intensity of the electric or magnetic field, and the controller applies an electric or magnetic field to the liquid crystal intermittently.

According to the seventeenth feature of the present invention, there is provided a method of causing a flow of liquid crystal, which comprises the steps of (i) putting liquid crystal in a channel defined by at least one wall surface, (ii) twisting the liquid crystal about an axis intersecting said at least one wall surface and restricting the molecules of the liquid crystal so that they will turn in one and the same direction by using a twisting/restricting means, and (iii) applying an electric or magnetic field to the restricted molecules, the field being in a direction intersecting said at least one wall surface, to turn them by using a field-applying/molecule-turning means.

According to the eighteenth feature of the present invention, there is provided the method of causing a flow of liquid crystal of the seventeenth feature. The channel has a pair of wall surfaces facing each other, and the twisting/restricting means has a pair of orientation films, either of the paired wall surfaces being fitted with one orientation film, the paired orientation films being rubbed in one and the same direction.

According to the nineteenth feature of the present invention, there is provided the method of causing a flow of liquid crystal of the seventeenth feature. The channel has a pair of wall surfaces facing each other. The twisting/restricting means has a pair of orientation films, either of the paired wall surfaces being fitted with one orientation film. The rubbing direction of one orientation film is at an angle with the rubbing direction of the other orientation film.

According to the twentieth feature of the present invention, there is provided the method of causing a flow of liquid crystal of the seventeenth feature. The field-applying/molecule-turning means includes a controller to control the timing in applying an electric or magnetic field to the liquid crystal and the intensity of the electric or magnetic field, and the controller applies an electric or magnetic field to the liquid crystal intermittently.

According to the first feature of the present invention, when an electric or magnetic field is applied to the liquid crystal which is twisted about an axis intersecting said at least one wall surface, its molecules turn about their centers of gravity in one and the same direction in a plane intersecting said at least one wall surface, causing the liquid crystal to flow. Because the force in a cross section of the flow of the liquid crystal does not add up to zero, the flow of the liquid crystal can easily be applied to object-moving devices, sensors, actuators, etc.

According to the second feature of the present invention, the paired wall surfaces are provided with the paired orientation films rubbed in the same direction; therefore, the liquid crystal is twisted by 180° between the wall surfaces. When an electric or magnetic field is applied to the liquid crystal, it flows in the opposite of the rubbing direction of the orientation films.

According to the third feature of the present invention, the paired wall surfaces are provided with the paired orientation films and the rubbing direction of the surface of one orientation film is at an angle with the rubbing direction of the surface of the other orientation film; accordingly, the liquid crystal is twisted by the same angle. When an electric of magnetic field is applied to the liquid crystal, it flows in a direction at an angle with the rubbing direction of one orientation film and another angle with the rubbing direction of the other orientation film. Accordingly, the liquid crystal can be caused to flow in any desired direction by adjusting the twist angle of the liquid crystal.

According to the fourth feature of the present invention, because the molecules of the liquid crystal are tilted, they can always be turned in a certain direction by using the means for turning them. Thus, the liquid crystal can always be caused to flow in a certain direction.

According to the fifth feature of the present invention, when the controller applies an electric or magnetic field to the liquid crystal intermittently, it flows intermittently in a certain direction. The flow rate can be changed by changing the time intervals of application of an electric or magnetic field or the intensity of the electric or magnetic field. Besides, if the time intervals of application of an electric or magnetic field are shortened, the flow of the liquid crystal becomes more continuous.

According to the sixth feature of the present invention, when an electric field is applied to the liquid crystal, its molecules turn about their centers of gravity in one and the same direction, causing the liquid crystal to flow. Accordingly, the movable upper member with its electrode is moved in the direction of the flow of the liquid crystal. Thus, the flows of liquid crystal can be utilized for the movement of members; therefore, the flows of liquid crystal can be applied to conveying devices, etc.

According to the seventh feature of the present invention, when a magnetic field is applied to the liquid crystal, its molecules turn about their centers of gravity in one and the same direction, causing the liquid crystal to flow. Accordingly, the movable upper member with its magnetic pole is moved in the direction of the flow of the liquid crystal. Thus, the flows of liquid crystal can be utilized for the movement of members; therefore, the flows of liquid crystal can be applied to conveying devices, etc.

According to the eighth feature of the present invention, the twist angle of the liquid crystal and, hence, the flowing direction of the liquid crystal can be adjusted by changing the rubbing directions of the pair of orientation films; accordingly, the movable upper member can be moved in any desired direction by adjusting the rubbing directions of the pair of orientation films.

According to the ninth feature of the present invention, the liquid crystal is twisted between the upper surface of the fixed lower member and the lower surface of the movable upper member and the twist angle of the liquid crystal and, hence, the flowing direction of the liquid crystal can be adjusted by changing the rubbing directions of the pair of orientation films; accordingly, the movable upper member can be moved in any desired direction by adjusting the rubbing directions of the pair of orientation films.

According to the tenth feature of the present invention, when an electric field is applied to the liquid crystal, its molecules turn about their centers of gravity in one and the same direction, causing the liquid crystal to flow. Because the shaft is journaled in the outer member, the latter with its electrode rotates about the former if the former is fixed. If the outer member is fixed, the shaft with its electrode rotates in the outer member. Thus, the flow of liquid crystal can be utilized for the movement of members, and the liquid crystal motor of the eighth feature can be applied to motors, drills, etc.

According to the eleventh feature of the present invention, when a magnetic field is applied to the liquid crystal, its molecules turn about their centers of gravity in one and the same direction, causing the liquid crystal to flow. Because the shaft is journaled in the outer member, the latter with its magnetic pole rotates about the former if the former is fixed. If the outer member is fixed, the shaft with its magnetic pole rotates in the outer member. Thus, the flow of liquid crystal can be utilized for the movement of members, and the liquid crystal motor of the eighth feature can be applied to motors, drills, etc.

According to the twelfth feature of the present invention, the liquid crystal can be twisted between the outer member and the shaft by adjusting the rubbing directions of the orientation films. If the liquid crystal is twisted, the liquid crystal flows at an angle with lines tangent to the surface of the shat. Accordingly, the shaft or the outer member can be not only rotated but also moved axially.

According to the thirteenth feature of the present invention, the liquid crystal is twisted between the outer member and the shaft, the liquid crystal flows at an angle with lines tangent to the surface of the shat. Accordingly, the shaft or the outer member can be not only rotated but also moved axially.

According to the fourteenth feature of the present invention, when an electric or magnetic field is applied to the liquid crystal, its molecules turn about their centers of gravity in one and the same direction, causing the liquid crystal to flow. The sub-means twists the liquid crystal about an axis intersecting one of the paired wall surfaces and restricts the molecules of the liquid crystal so that those in the right sub-space will turn in one direction and those in the left sub-space will turn in the opposite direction. Accordingly, when the means turns the molecules of liquid crystal on either side of the inner member in a plane intersecting the inside surface of the outer member, the liquid crystal flows toward or away from the inner member. Thus, the inner member can be moved in either direction along the inside surface of the outer member. In other words, the flow of the liquid crystal can be transformed into the motion of the inner member; therefore, the liquid crystal motor can be applied to actuators, etc.

According to the fifteenth feature of the present invention, the parts of the upper and lower orientation films on the right side of the inner members are rubbed from the left to the right, and the parts of the upper and lower orientation films on the left side of the inner members are rubbed from the right to the left. Accordingly, when the means turns the molecules of liquid crystal on either side of the inner member in a plane intersecting the inside surface of the outer member, the liquid crystal flows toward the inner member. Thus, the inner member can be moved in either direction along the inside surface of the outer member. In other words, the flow of the liquid crystal can be transformed into the motion of the inner member; therefore, the liquid crystal motor can be applied to actuators, etc.

According to the sixteenth feature of the present invention, when the controller applies an electric or magnetic field to the liquid crystal intermittently, the liquid crystal flows intermittently in a certain direction. The flow rate can be changed by changing the time intervals of application of an electric or magnetic field or the intensity of the electric or magnetic field. Besides, if the time intervals of application of an electric or magnetic field are shortened, the flow of the liquid crystal becomes more continuous.

According to the seventeenth feature of the present invention, when an electric or magnetic field is applied to the liquid crystal, its molecules turn about their centers of gravity in one and the same direction, causing the liquid crystal to flow. Because the liquid crystal is twisted about an axis intersecting said at least one wall surface, the liquid crystal flows in a direction intersecting said at least one wall surface when the means turns the molecules of the liquid crystal in a plane intersecting said at least one wall surface. The force in a cross section of the flow does not add up to zero; accordingly, the flow of the liquid crystal can easily applied to object-moving devices, sensors, actuators, etc.

According to the eighteenth feature of the present invention, because the paired orientation films are rubbed in one and the same direction, the liquid crystal is twisted by 180° between the paired wall surfaces. Accordingly, the liquid crystal flow in the opposite of the rubbing direction.

According to the nineteenth feature of the present invention, because the rubbing direction of one orientation film is at an angle with the rubbing direction of the other orientation film, the liquid crystal is twisted by the same angle; accordingly, the liquid crystal flows in a direction intersecting one of the paired wall surfaces. Besides, the flowing direction of the liquid crystal can be changed by changing the twist angle of the liquid crystal. Thus, the liquid crystal can be caused to flow in any desired direction by adjusting the twist angle.

According to the nineteenth feature of the present invention, there is provided the method of causing a flow of liquid crystal of the seventeenth feature. The channel has a pair of wall surfaces facing each other. The twisting/restricting means has a pair of orientation films, either of the paired wall surfaces being fitted with one orientation film. The rubbing direction of one orientation film is at an angle with the rubbing direction of the other orientation film.

According to the twentieth feature of the present invention, when the controller applies an electric or magnetic field to the liquid crystal intermittently, the liquid crystal flows intermittently in a certain direction. The flow rate can be changed by changing the time intervals of application of an electric or magnetic field or the intensity of the electric or magnetic field. Besides, if the time intervals of application of an electric or magnetic field are shortened, the flow of the liquid crystal becomes more continuous.

BRIEF DESCRIPTION OF THE DRAWINGS

FIG. 1(A) is the y-z section of the mechanism before the application of an electric field. FIG. 1(B) shows the arrangement of molecules of liquid crystal in the y-z section when an electric field is applied to the liquid crystal. FIG. 1(C) shows the velocity distribution between the wall surfaces in the y-z section caused by the application of the electric field.

FIG. 2(A) is the x-y section of the mechanism before the application of an electric field. FIG. 2(B) shows the arrangement of molecules of liquid crystal in the x-y section when an electric field is applied to the liquid crystal. FIG. 2(C) shows the velocity distribution between the wall surfaces in the x-y section when an electric field is applied to the liquid crystal.

DETAILED DESCRIPTION OF THE INVENTION

Before describing the mechanism for causing a flow of liquid crystal of the present invention, the principle of the occurrence of a flow of liquid crystal at the time of application of an electric or magnetic field to the liquid crystal will be described.

When an electric or magnetic field is applied to a liquid crystal, the axes of its molecules are rearranged at a certain peculiar angle with the direction of electric or magnetic force. Described below is a liquid crystal whose molecules' axes are rearranged along the direction of electric or magnetic force when an electric or magnetic field is applied to the liquid crystal.

Because the molecules of crystal liquid are rearranged when either of electric and magnetic fields is applied, description about application of an electric field alone will follow.

Figure 3:
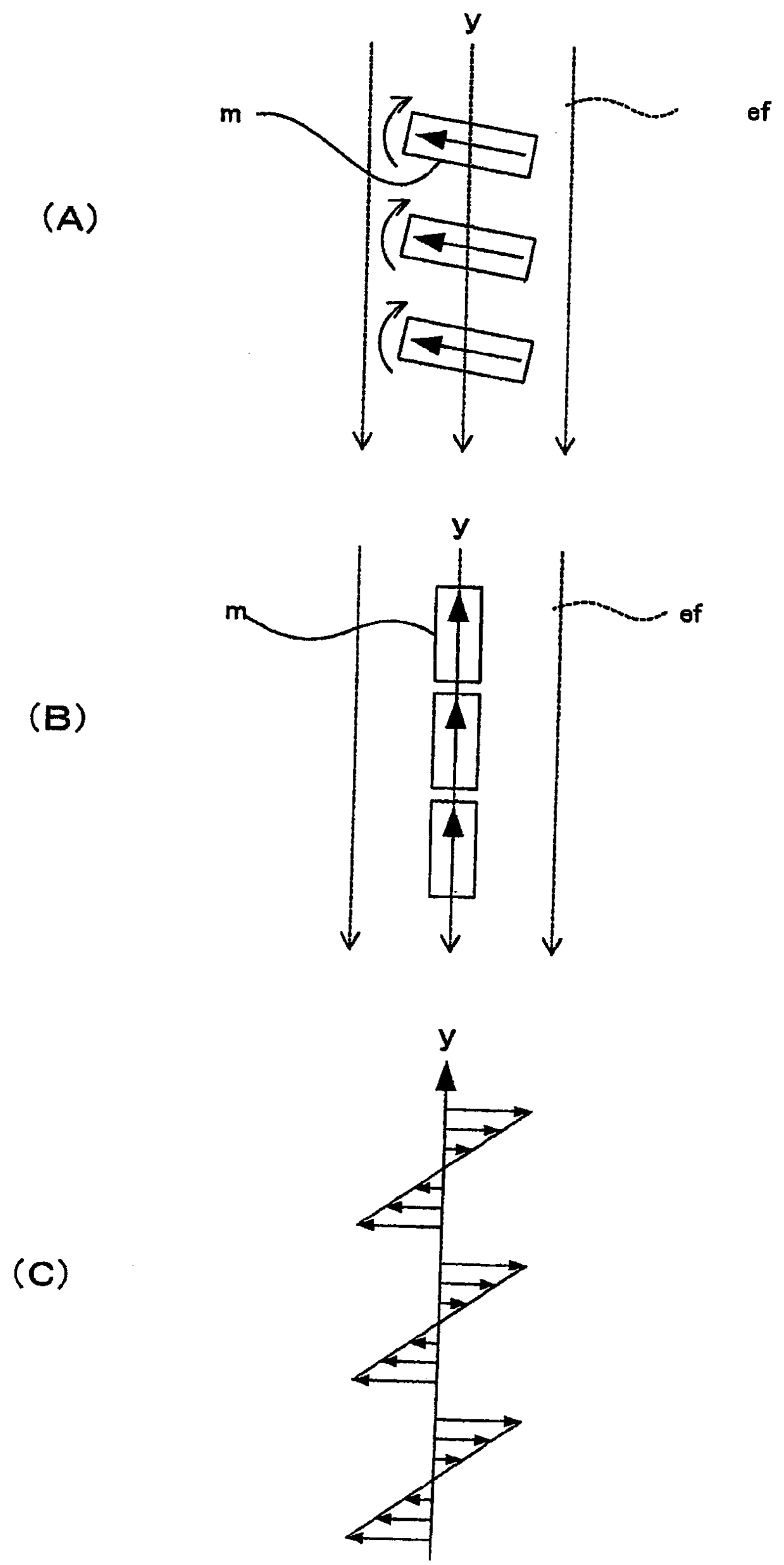
FIG. 3 is an illustration of the motion of the molecules when an electric field is applied to liquid crystal.
Figure 4:
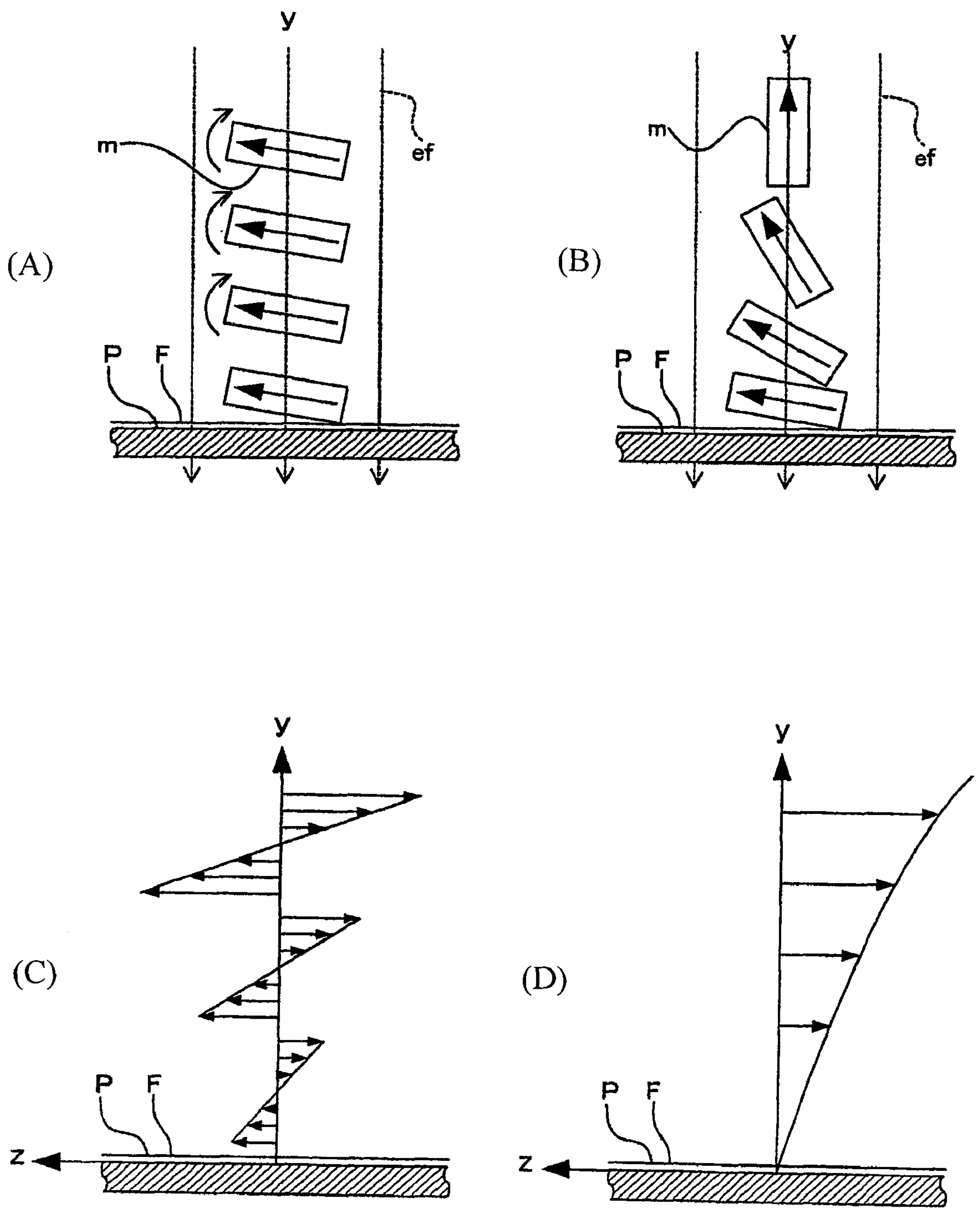
FIG. 4 is an illustration of the motion of the molecules when an electric field is applied to liquid crystal on a plate.

FIG. 3 is an illustration of the motion of the molecules "m" when an electric field "ef" is applied to liquid crystal "LC." FIG. 4 is an illustration of the motion of the molecules "m" when an electric field "ef" is applied to liquid crystal "LC" on a plate "P." As shown in FIG. 3, when an electric field "ef" is applied to the liquid crystal "LC" at an angle with the axes of its molecules "m," the molecules "m" turn [as shown by arrows in FIG. 3(A)] so as to align their axes with the direction of electric force [as shown in FIG. 3(B)]. Consequently, a velocity gradient occurs around each molecule and liquid crystal flows [as shown in FIG. 3(C)].

The reference sign "F" in the FIG. 4 is an orientation film laid on a plate "P." The orientation film "F" is made of a polymer such as polyimide. When part of liquid crystal "LC" is put into contact with the orientation film "F," molecules adjacent to the plate "P" are "anchored," or "restricted," to the orientation film "F." Accordingly, when an electric field "ef" is applied to the liquid crystal "LC," the turns of molecules adjacent to the plate "P" are held down; they cannot turn so as to align their axes with the direction of electric force of the electric field "ef" [as shown in FIG. 4(B)]. The nearer to the plate "P" the molecule "m" comes, the smaller its turn becomes; the turn of the molecule "m" is "zero" at the surface of the plate "P." Thus, the nearer to the plate "P" the molecule "m" comes, the smaller the velocity gradient around the molecule "m" becomes [as shown in FIG. 4(C)].

Thus, when part of liquid crystal "LC" is anchored to an orientation film "F" laid on a plate "P," the liquid crystal "LC" flows with the velocity distribution shown in FIG. 4(D).

Now the mechanism for causing a flow of liquid crystal of the present invention is described below.

Figure 1:
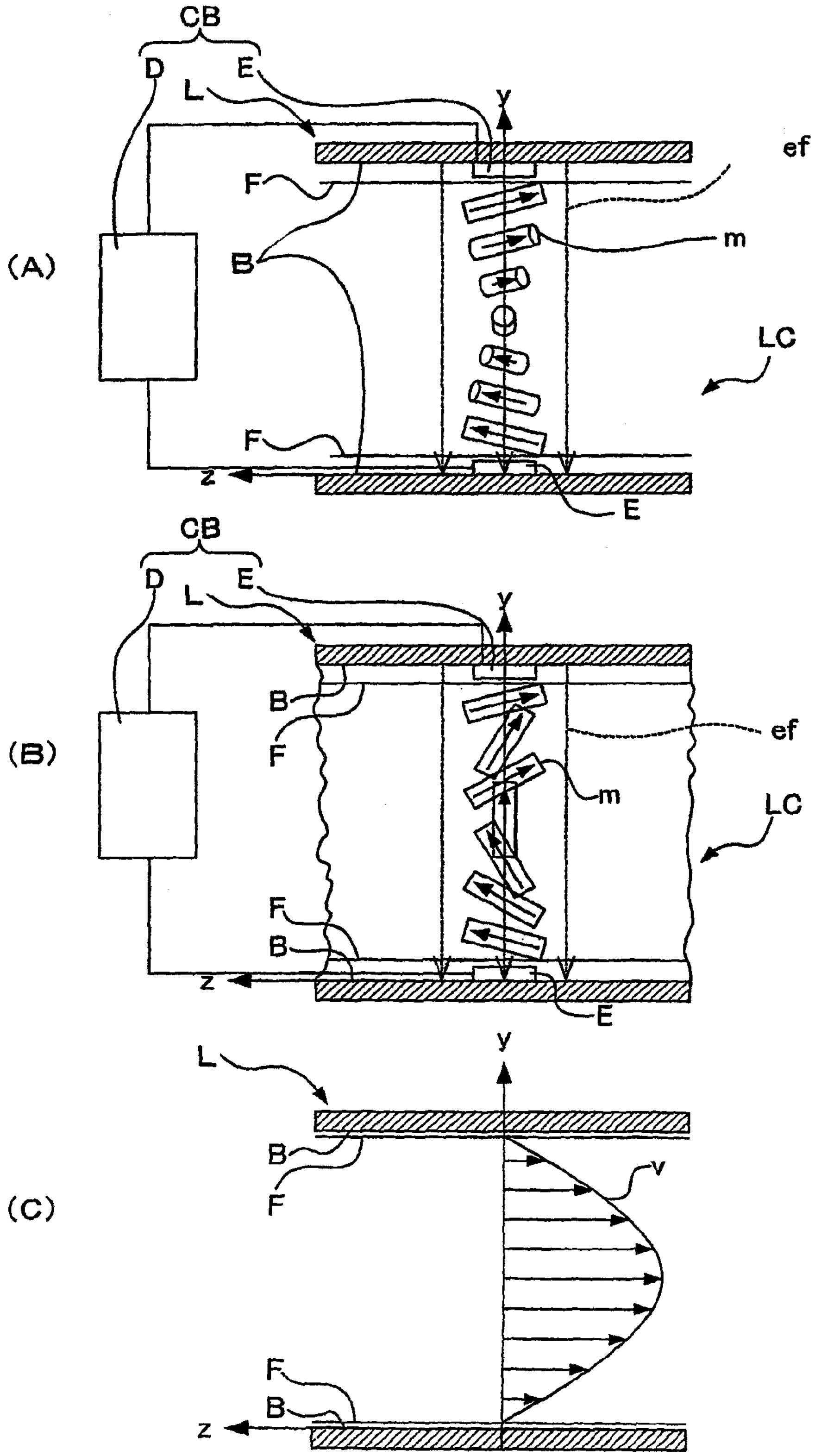
FIG. 1 is a schematic illustration of the mechanism for causing a flow of liquid crystal.

FIG. 1 is a schematic illustration of the mechanism for causing a flow of liquid crystal. FIG. 1(A) is the y-z section of the mechanism before the application of an electric field. FIG. 1(B) shows the arrangement of molecules "m" of liquid crystal "LC" in the y-z section when an electric field "ef" is applied to the liquid crystal "LC." FIG. 1(C) shows the velocity distribution between wall surfaces "B" and "B" in the y-z section caused by the application of the electric field "ef."

The reference sign "L" indicates a channel wherein the liquid crystal "LC" flows. This channel "L" has two wall surfaces "B" and "B" facing each other. The two wall surfaces "B" and "B" are flat and in parallel with each other.

The wall surfaces "B" and "B" do not need to be in parallel with each other. One may be at an angle with the other.

The wall surfaces "B" and "B" do not need to be flat; one may be flat and the other may be uneven, or both may be uneven.

A liquid crystal "LC" is put between the wall surfaces "B" and "B." The liquid crystal "LC" may be nematic, smectic, cholesteric, or discotic, but kinds of liquid crystal "LC" are not restricted to those so long as their molecules turn when an electric field is applied to them.

An orientation film "F" is laid on each wall surfaces "B" and "B." The orientation films "F" and "F" are made of a polymer such as polyimide.

The surfaces of the orientation films "F" and "F" are rubbed from the right to the left.

Therefore, liquid-crystal molecules "m" in contact with the orientation films "F" and "F" are anchored to them.

Accordingly, the molecules "m" in contact with the lower orientation film "F" lie along the direction of rubbing (along the z-coordinate axis) with their left ends pulled up. In other words, their ends on the downstream side of the rubbing are pulled away from the orientation film "F."

On the other hand, the molecules "m" in contact with the upper orientation film "F" lie along the direction of rubbing (along the z-coordinate axis) with their left ends pulled down. In other words, their ends on the downstream side of the rubbing are pulled away from the orientation film "F."

Besides, the molecules "m" between those in contact with the upper orientation film "F" and those in contact with the lower orientation film "F" lie so as to minimize the differences in direction between adjacent molecules "m."

Therefore, the direction of molecules of liquid crystal "LC" put between the wall surfaces "B" and "B" of the channel "L" is turned by 180° about an axis perpendicular to the wall surfaces "B" and "B" (about the y-coordinate axis). Namely, the liquid crystal "LC" is twisted by 180° between the upper and lower wall surfaces "B" and "B."

Instead of the orientation films "F," rubbing-less treatment may be made to the wall surfaces "B" and "B."

An electrode "E" is fitted on each wall surface "B," under its orientation film "F." The two electrodes "E" and "E" are so disposed that the direction of electric force will be perpendicular to the wall surfaces "B" and "B." The electrodes "E" and "E" are connected to a controller "D" with a power supply.

Accordingly, when the controller "D" applies voltage to the electrodes "E" and "E," an electric field "ef," of which the direction of electric force is perpendicular to the wall surfaces "B" and "B," is formed between the wall surfaces "B" and "B." The pair of electrodes "E" and "E" is the reorientation device mentioned in the claims of the present invention.

The pair of electrodes "E" and "E," the pair of orientation films "F" and "F," and the controller "D" constitute the means for turning the molecules of liquid crystal "CB" mentioned in the claims of the present invention.

The two electrodes "E" and "E" do not need to be so disposed that the direction of electric force will be perpendicular to the wall surfaces "B" and "B." They may be disposed in any other way so long as they form an electric field "ef" between them to turn the molecules of liquid crystal in a plane intersecting one of the two wall surfaces "B" and "B."

Besides, the two electrodes "E" and "E" may be fitted on the outside of the channel "L." In this case, an electric field "ef" can be formed between the two wall surfaces "B" and "B" if the channel "L" is made of a conductive material or a material which the lines of electric force can penetrate.

Moreover, an electric field "ef" can be formed between the two wall surfaces "B" and "B" if the channel "L" is made of a conductive material and connected directly to the controller "D" and the controller "D" applies voltage to the channel "L."

The working and effect of the mechanism for causing a flow of liquid crystal will be described below.

When the controller "D" applies voltage to the electrodes "E" and "E," an electric field "ef," of which the direction of electric force is perpendicular to the wall surfaces "B" and "B," is formed between the wall surfaces "B" and "B." Accordingly, the molecules "m" of liquid crystal "LC" turn to be in parallel with the direction of electric force [as shown in FIG. 1(B)] and a velocity gradient occurs around each molecule "m."

Because the left ends of both the molecules "m" near the upper wall "B" and the molecules "m" near the lower wall "B" are pulled away from the orientation films "F" and "F" and the direction of molecules "m" is turned by 180° about the y-coordinate axis between the two wall surfaces "B" and "B," the molecules "m" of the liquid crystal "LC" are arranged symmetrically with respect to the middle point on the y-coordinate axis between the two wall surfaces "B" and "B."

Accordingly, the upper molecules "m" in the channel "L" turn counterclockwise; the lower molecules "m," clockwise. Therefore, the velocity gradient caused by a molecule "m" near the upper wall surface "B" and the velocity gradient caused by a molecule "m" near the lower wall surface "B" are symmetrical with respect to the horizontal middle plane between the wall surfaces "B" and "B."

Besides, the axes of molecules "m" at the middle point between the two wall surfaces "B" and "B" lie along the x-coordinate axis. Namely, their axes are at right angles with the direction of rubbing; therefore, their turns do not cause velocity components in the direction of rubbing. Therefore, a velocity distribution shown in FIG. 1(C) occurs in the channel "L," the liquid crystal "LC" flowing to the right, or in the opposite of the direction of the rubbing.

When the controller "D" stops applying voltage to the electrodes "E" and "E," the molecules "m" of liquid crystal "LC" return to their state before the application of voltage; the upper molecules "m" in the channel "L" turn clockwise and the lower molecules "m" in the channel "L" turn counterclockwise. Thus, every molecule "m" turns in the opposite of the turning direction at the time of application of voltage. Therefore, the velocity distribution of FIG. 1(C) is reversed, the liquid crystal "LC" flowing to the left, or in the direction of rubbing.

However, the turns of molecules "m" at the time of stopping the application of voltage are slower than the turns of molecules "m" at the time of application of voltage; therefore, the flow rate of liquid crystal "LC" at the time of stopping the application of voltage is smaller than the flow rate of liquid crystal "LC" at the time of application of voltage.

Therefore, when voltage is applied to the electrodes "E" for an instant, the liquid crystal "LC" flows to the right, or in the opposite of the direction of rubbing, by the difference between the flow rate to right and the flow rate to the left.

Figure 2:
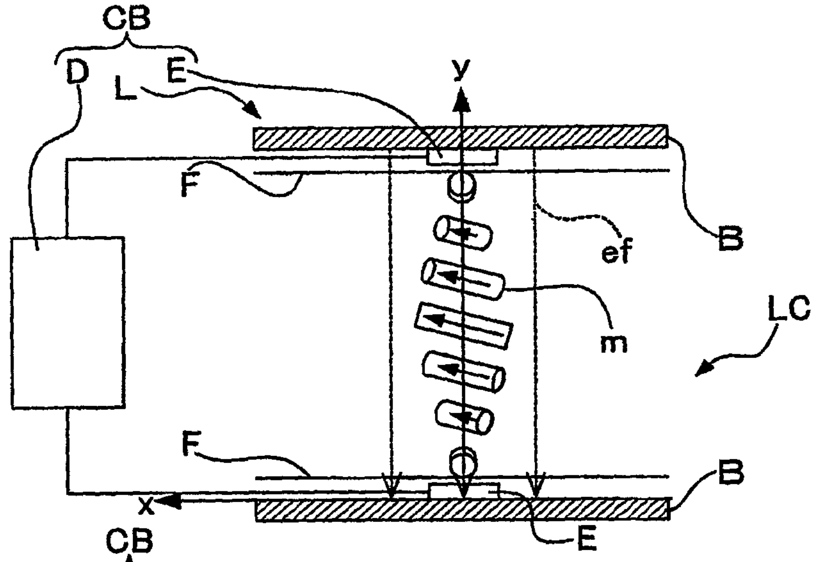
FIG. 2 is a schematic illustration of the mechanism for causing a flow of liquid crystal of FIG. 1.
Figure 2:
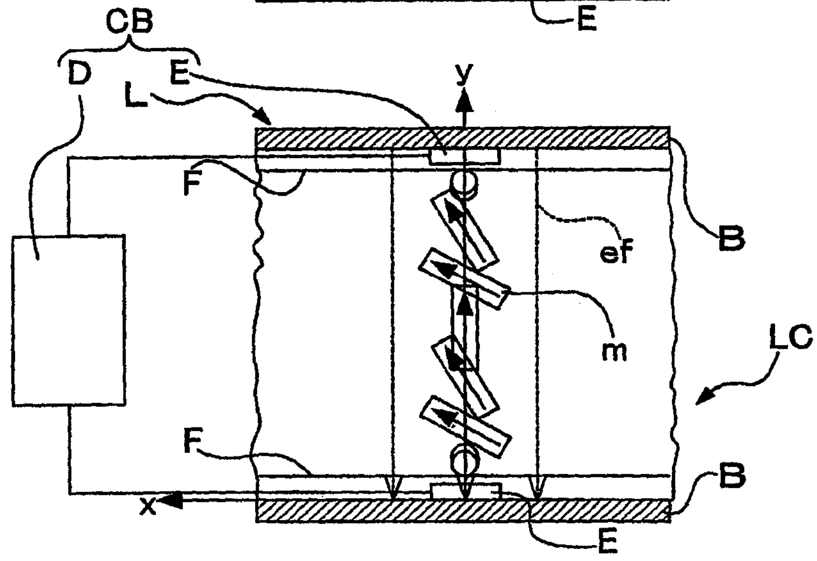
Figure 2:
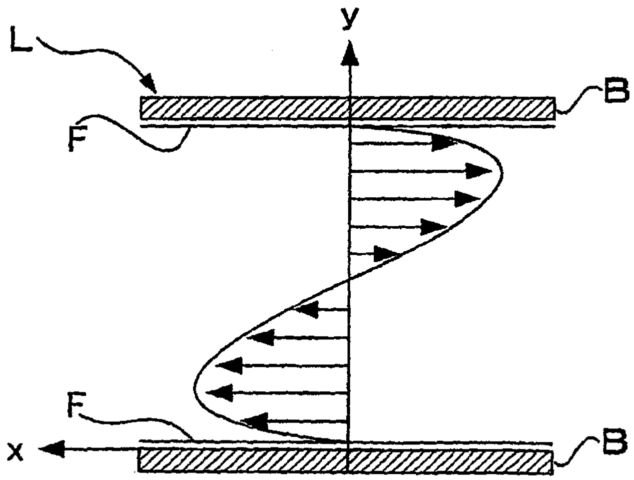

FIG. 2 is a schematic illustration of the mechanism for causing a flow of liquid crystal of FIG. 1. FIG. 2(A) is the x-y section of the mechanism for causing a flow of liquid crystal before the application of an electric field "ef." FIG. 2(B) shows the arrangement of molecules "m" of liquid crystal "LC" in the x-y section when an electric field "ef" is applied to the liquid crystal "LC." FIG. 2(C) shows the velocity distribution between the wall surfaces "B" and "B" in the x-y section when an electric field "ef" is applied to the liquid crystal "LC." As shown in FIGS. 2(A) and 2(B), the arrangement of upper molecules "m" and the arrangement of the lower molecules "m" in the channel "L" are symmetrical with respect to the middle point on the y-coordinate axis between the wall surfaces "B" and "B" as seen in the direction of the z-coordinate axis. Besides, the direction of molecules "m" at the middle between the wall surfaces "B" and "B" is perpendicular to the direction of rubbing. Accordingly, as shown in FIG. 2(C), a velocity distribution, which is symmetrical with respect to the middle point on the y-coordinate axis between the wall surfaces "B" and "B", is formed in the plane which contains the x- and y-coordinate axes. Thus, the flow rates in the plane containing the x- and y-coordinate axes add up to zero.

According to the mechanism for causing a flow of liquid crystal of the present invention, because put between the two wall surfaces "B" and "B" is liquid crystal "LC" whose molecules' direction is twisted by 180° between the wall surfaces "B" and "B," there occurs a liquid-crystal flow in the opposite of the direction of rubbing when voltage is applied to the electrodes "E" and "E" for an instant.

Namely, the force in the cross section of the flow of liquid crystal "LC" does not add up to zero; therefore, the liquid-crystal flow can easily be utilized for making object-moving devices, sensors, actuators, etc.

If the controller "D" of the means for turning the molecules of liquid crystal "CB" applies pulse-like voltage to the electrodes "E" and "E," the liquid crystal "LC" flows intermittently in the channel "L." Besides, by changing the time intervals of pulses, or the time intervals of application of an electric field, the flow rate of liquid crystal "LC" can be changed. Moreover, by shortening the time intervals of application of an electric or magnetic field, a more continuous liquid-crystal flow can be achieved.

Although the surfaces of both the orientation films "F" and "F" of the above mechanism for causing a flow of liquid crystal are rubbed in one and the same direction, rubbing may be made in different directions. For example, the direction of upper rubbing may be at an angle with the direction of lower rubbing. In this case, the axes of molecules "m" near the upper orientation film "F" lie at the same angle with the axes of molecules "m" near the lower orientation film "F." Thus, the liquid crystal "LC" between the two wall surfaces "B" and "B" is twisted by the same angle.

Accordingly, not only the velocity distribution in the direction of rubbing of the lower orientation film "F" (along the z-axis) but also the velocity distribution in the direction perpendicular to the direction of rubbing of the lower orientation film "F" (along the x-axis) is asymmetrical with respect to the middle point on the y-coordinate axis between the wall surfaces "B" and "B." Accordingly, the flow rate of liquid crystal "LC" in the direction perpendicular to the direction of rubbing of the lower orientation film "F," too, is not zero. Thus, the liquid crystal "LC" flows at an angle with the direction of rubbing of the lower orientation film "F."

The force in a cross section of the flow of liquid crystal "LC" does not add up to zero; therefore, the flow of liquid crystal "LC" can easily be utilized for making object-moving devices, sensors, actuators, etc.

By changing the angle of twist of the liquid crystal "LC," the flow rates in the direction of rubbing of the lower orientation film "F" and in the direction perpendicular to the direction of rubbing of the lower orientation film "F" can be changed. Thus, by adjusting the angle of twist of liquid crystal "LC," flows in any desired directions can be achieved.

If a chiral agent, which regulates the twisting direction of liquid crystal, is mixed into the liquid crystal "LC," the twist angle of the liquid crystal "LC" can be changed freely. For example, if the rubbing direction of the upper orientation film "F" is changed by 90° clockwise relatively to the rubbing direction of the lower orientation film "F" and a chiral agent, which regulates the twisting direction of liquid crystal clockwise, is mixed into the liquid crystal "LC," the liquid crystal "LC" is twisted by 90° clockwise between the wall surfaces "B" and "B." If a chiral agent, which regulates the twisting direction of liquid crystal counterclockwise, is mixed into the liquid crystal "LC," the liquid crystal "LC" is twisted by 270° counterclockwise.

If the axes of molecules "m" of a liquid crystal are rearranged at right angles to the direction of electric force when an electric field is applied, the axes of molecules "m" of the liquid crystal may be arranged slightly off the direction perpendicular to the wall surfaces "B" and "B" in the channel "L." Then, if the liquid crystal is twisted by 180° between the wall surfaces "B" and "B," a velocity distribution shown in FIG. 1(C) is formed.

Besides, the channel "L" does not need to have the two wall surfaces "B" and "B." For example, the channel "L" may be a round pipe, a V-shaped trough, a simple flat plate, or the like.

If the channel "L" is a round pipe and the liquid crystal "LC" is twisted about an axis intersecting the wall of the round pipe, a flow of the liquid crystal "LC" along the axis of the round pipe occurs.

If the channel "L" is a V-shaped trough and the liquid crystal "LC" is twisted about an axis intersecting one of the two wall surfaces, a flow of the liquid crystal "LC" in any desired direction along the wall surface occurs.

If the channel "L" is a flat plate and the liquid crystal "LC" is twisted about an axis intersecting the flat plate, a flow of the liquid crystal "LC" can be generated in any desired direction on the flat plate. If the liquid crystal "LC" is not twisted, a flow of the liquid crystal "LC" can be generated on the flat plate.

Next, the object-moving mechanism according to the present invention will be described below.

Next, the liquid crystal motor according to the present invention will be described below.

Figure 5:
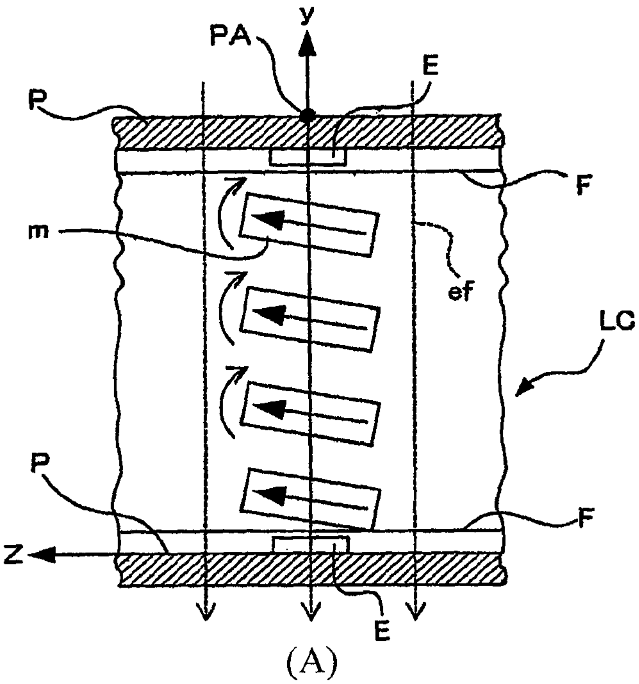
FIG. 5 is an illustration of the liquid crystal motor of the first embodiment of the present invention.
Figure 5:
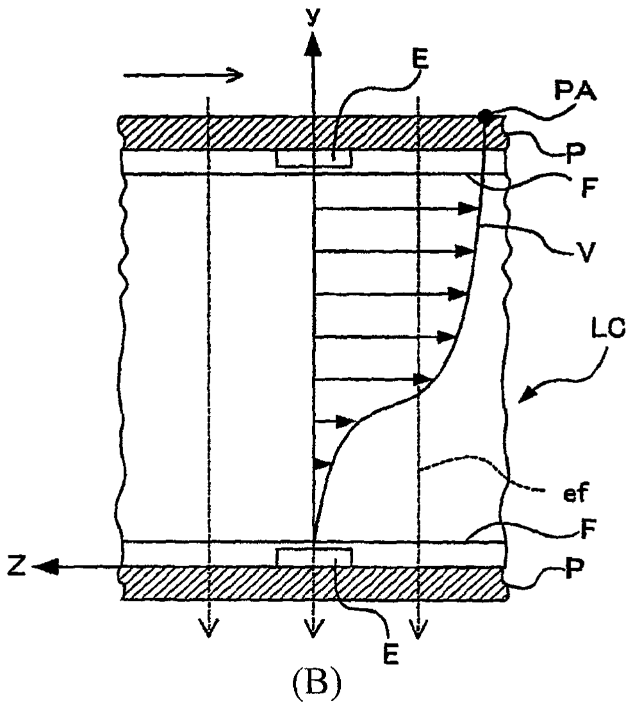

FIG. 5 is an illustration of the liquid crystal motor of the first embodiment of the present invention. The reference sign "P" is a pair of members. The members "P" and "P" have flat inside surfaces and are parallel to each other. One (the lower member in FIG. 5) of the two members "P" and "P" is fixed and the other (the upper member in FIG. 5) is movable relatively to the fixed member.

Liquid crystal "LC" is put between the two members "P" and "P." The liquid crystal "LC" may be nematic, smectic, cholesteric, or discotic, but kinds of liquid crystal "LC" are not restricted to those so long as their molecules turn when an electric field is applied to them.

Orientation films "F" and "F" are laid on the inside surfaces of the members "P" and "P." The orientation films "F" are made of a polymer such as polyimide.

The surface of the lower orientation film "F" is rubbed from the right to the left; the surface of the upper orientation film "F," from the left to the right.

Accordingly, all the molecules "m" of the liquid crystal "LC" are arranged with their axes along the rubbing directions, the left ends of the axes slightly pulled up.

The orientation films "F" are not necessary if rubbing-less treatment is made to the insides of the members "P" and "P."

An electrode "E" is fitted on the inside of each member "P," under its orientation film "F." The two electrodes "E" and "E" are disposed so that the direction of electric force will be perpendicular to the members "P" and "P." The electrodes "E" and "E" are connected to a controller "D" with a power supply (not shown).

Accordingly, when the controller "D" applies voltage to the electrodes "E" and "E," an electric field "ef," of which the direction of electric force is perpendicular to the members "P" and "P," is formed between the members "P" and "P." The pair of electrodes "E" and "E," the pair of orientation films "F" and "F," and the controller "D" (not shown) constitute the means for turning the molecules of liquid crystal mentioned in the claims of the present invention.

The two electrodes "E" and "E" do not need to be so disposed that the direction of electric force will be perpendicular to the members "P" and "P." They may be disposed in any other way so long as they form an electric field "ef" between them to turn the molecules of liquid crystal in a plane intersecting one of the two members "P" and "P."

Besides, the two electrodes "E" and "E" may be fitted on the outsides of the members "P" and "P." In this case, an electric field "ef" can be formed between the two members "P" and "P" if the members "P" and "P" are made of a conductive material or a material which the lines of electric force can penetrate.

Moreover, an electric field "ef" can be formed between the members "P" and "P" if the members "P" and "P" are made of a conductive material and connected directly to the controller "D" and the controller "D" applies voltage to the members "P" and "P."

Accordingly, when voltage is applied to the electrodes "E" and "E" to form an electric field "ef" whose direction of electric force is perpendicular to the members "P" and "P," a flow of the liquid crystal "LC" parallel to the members "P" and "P," or in the direction of upper rubbing, occurs. Because the lower member "P" is fixed while the upper member "P" is movable relatively to the lower one, the upper member "P" is moved in the direction of the flow of liquid crystal "LC," or in the direction of upper rubbing, as shown in FIG. 5(B).

Rubbing may be made in different directions. For example, the direction of upper rubbing may be at an angle with the direction of lower rubbing. In this case, the axes of molecules "m" adjacent to the upper orientation film "F" lie at the same angle with the axes of molecules "m" adjacent to the lower orientation film "F". Thus, the liquid crystal "LC" between the members "P" and "P" is twisted by the same angle. Namely, the liquid crystal "LC" is twisted about an axis intersecting one of the members "P" and "P."

Accordingly, the direction of the flow of liquid crystal "LC" can be changed freely relative to the rubbing direction of the lower orientation film "F" by changing the rubbing direction of the upper orientation film "F" and, hence, the upper member "P" can be moved in any desired horizontal direction.

Thus, with the liquid crystal motor of the first embodiment, an object put on the upper member "P" can be moved in any desired horizontal direction relative to the lower member "P."

If pulse-like voltage is applied to the electrodes "E" and "E" by a controller D (not shown), the upper member "P" is moved intermittently relatively to the lower member "P." Besides, by changing the time intervals of pulses, or the time intervals of application of an electric field, the moving rate of the upper member "P" can be changed. Moreover, by shortening the time intervals of application of an electric or magnetic field, the upper member "P" can be moved more continuously.

The members "P" and "P" do not need to be in parallel with each other. If the upper member "P" is at an angle with the lower member "P," the former can be moved in the plane which it belongs to. Namely, three-dimensional movement of the upper member "P" relative to the lower member "P" is accomplished.

The insides of members "P" and "P" do not need to be flat; one may be flat and the other may be uneven, or both the insides may be uneven.

Next, the liquid crystal motor of the second embodiment will be described below.

Figure 6:
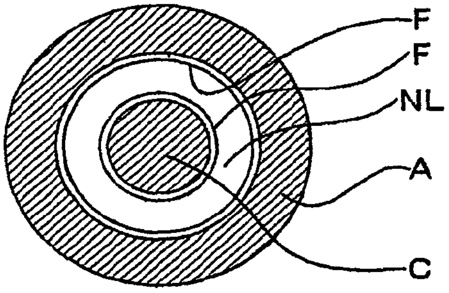
FIG. 6 is an illustration of the liquid crystal motor of the second embodiment of the present invention.
Figure 6:
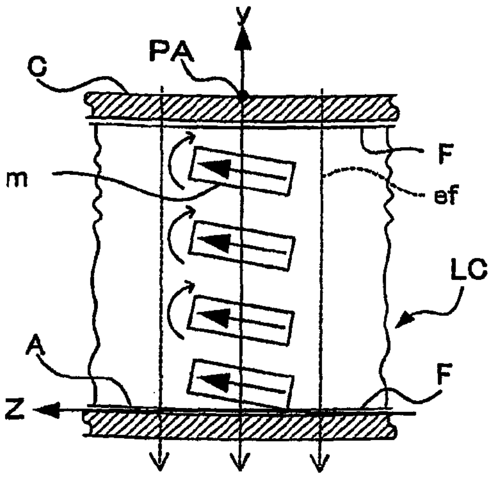
Figure 6:
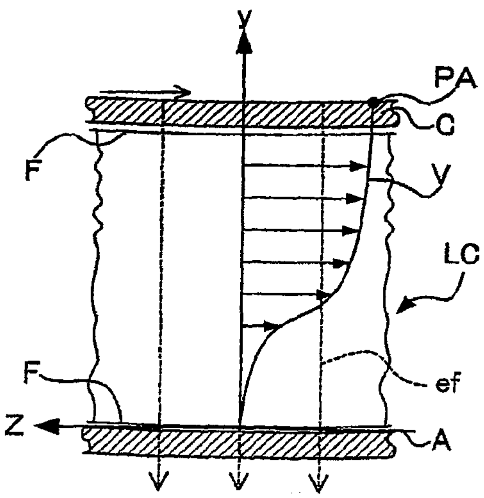

FIG. 6 is an illustration of the liquid crystal motor of the second embodiment. Liquid crystal "LC" is put between an outer member "A" and a shaft "C" in the outer member "A."

As shown in FIG. 6, the shaft "C" is put in the outer member "A" coaxially. Besides, the shaft "C" is journaled in the outer member "A." Liquid crystal "LC" is put between the outer member "A" and the shaft "C." Orientation films "F" and "F" are laid on the inside of the outer member "A" and the surface of the shaft "C." The orientation film "F" of the outer member "A" is rubbed clockwise; the orientation film "F" of the shaft "C," counterclockwise. Accordingly, the axes of all the molecules "m" of liquid crystal "LC" are arranged along lines tangent to the surface of the shaft "C," the ends of the axes on the downstream sides of rubbing slightly pulled away from the orientation films "F" and "F."

An electrode (not shown) is fitted to the outer member "A" and another electrode (not shown) is fitted to the shaft "C." When voltage is applied to the electrodes, a radial electric field is formed between the outer member "A" and the shaft "C."

Accordingly, if a radial electric field "ef" is formed between the outer member "A" and the shaft "C" while the outer member "A" is fixed, a flow of the liquid crystal "LC" along lines tangent to the surface of the shaft "C" occurs. Because the shaft "C" is journaled in the outer member "A," the shaft "C" rotates counterclockwise along the flow of the liquid crystal "LC."

If a radial electric field "ef" is formed between the outer member "A" and the shaft "C" while the shaft "C" is fixed, a flow of the liquid crystal "LC" along lines tangent to the inside surface of the outer member "A" occurs. Because the outer member "A" is journaled about the shaft "C," the outer member "A" rotates counterclockwise along the flow of the liquid crystal "LC."

If the orientation films "F" are rubbed so as to twist the liquid crystal "LC" between the outer member "A" and the shaft "C," the direction of the flow of the liquid crystal "LC" deviates from the directions of lines tangent to the surface of the shaft "C." Accordingly, the shaft "C" or the outer member "A" is not only rotated but also moved axially.

Thus, with the liquid crystal motor of the second embodiment, the shaft "C" or the outer member "A" is rotated.

If an electric field "ef" is applied intermittently to the liquid crystal "LC" between the outer member "A" and the shaft "C" by using a controller "D" (not shown), the shaft "C" or the outer member "A" is rotated intermittently. Besides, the speed of rotation of the shaft "C" or the outer member "A" can be changed by changing the frequency of application of an electric field "ef" Moreover, the angular velocity of rotation of the shaft "C" or the outer member "A" at any time can be made more constant by increasing the frequency of application of an electric or magnetic field.

Furthermore, if the orientation films "F" and "F" are rubbed so as to twist the liquid crystal "LC" between the outer member "A" and the shaft "C," the shaft "C" or the outer member "A" is not only rotated but also moved axially.

Next, the liquid crystal motor of the third embodiment will be described below.

Figure 7:
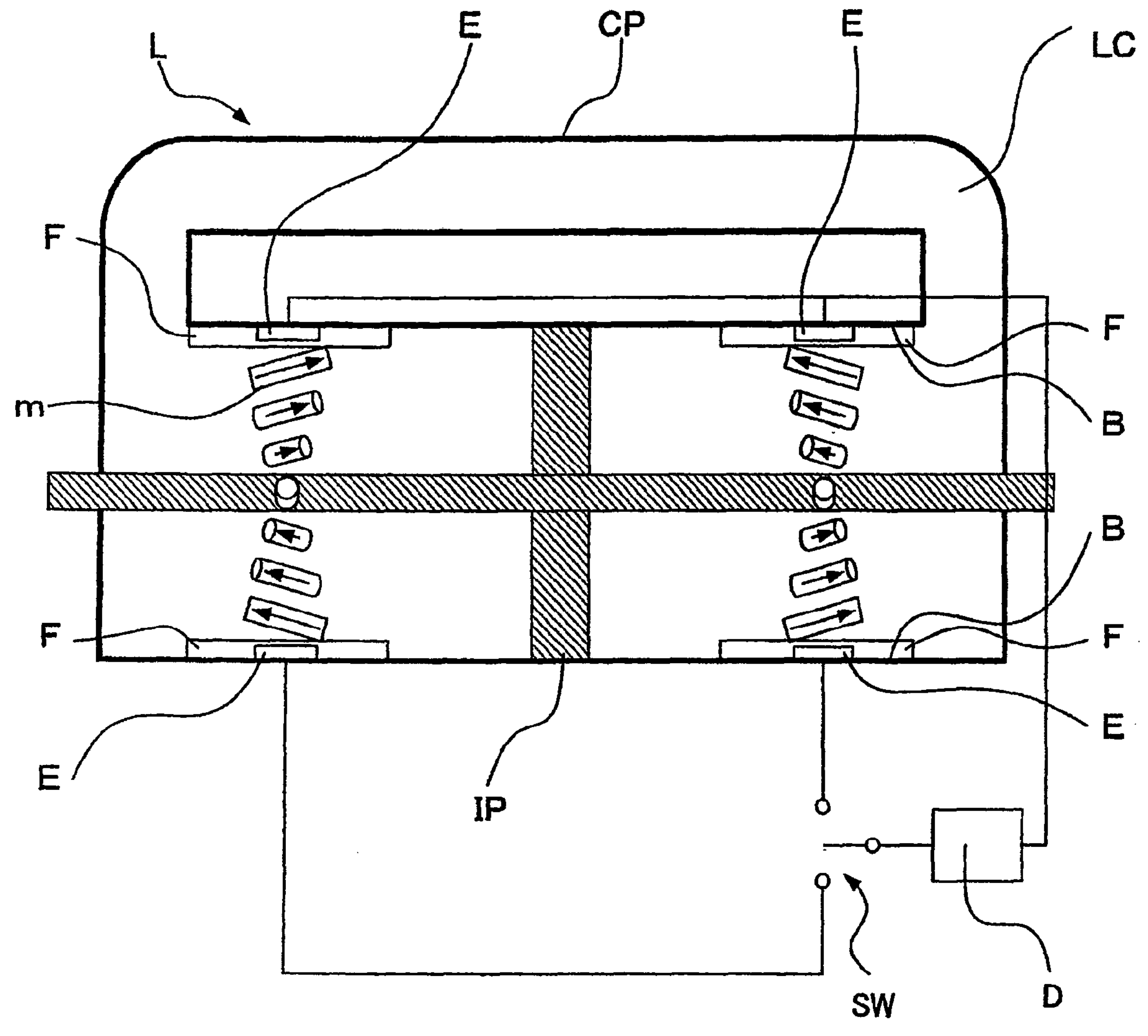
FIG. 7 is an illustration of the liquid crystal motor of the third embodiment of the present invention.

FIG. 7 is an illustration of the liquid crystal motor of the third embodiment. The reference sign "L" is an outer member, which has a square space defined by wall surfaces "B"

and "B" facing each other. The space is square in section. The right and left end portions of the space are connected by a channel "CP."

The space in the outer member "L" does not need to be square so long as it has the wall surfaces "B" and "B."

Besides, the space in the outer member "L" does not need to have the wall surfaces "B" and "B" and may be circular in section, no particular restriction put on the shape of the space.

An inner member "IP" is put in the space to divide the space into right and left subspaces. The inner member "IP" can be moved along the wall surfaces "B" and "B" while staying in touch with the wall surfaces "B" and "B."

Liquid crystal "LC" is put in the space and the channel "CP." The liquid crystal "LC" may be nematic, smectic, cholesteric, or discotic, but kinds of liquid crystal "LC" are not restricted to those so long as their molecules turn when an electric field is applied to them.

An orientation film "F" is laid on each wall surface "B." The orientation films "F" and "F" are made of a polymer such as polyimide.

The part of the lower orientation film "F" on the right side of the inner member "IP" is rubbed from the left to the right; the part of the lower orientation film "F" on the left side of the inner member "IP," from the right to the left.

On the other hand, the part of the upper orientation film "F" on the right side of the inner member "IP" is rubbed from the left to the right; the part of the upper orientation film "F" on the left side of the inner member "IP," from the right to the left.

In short, the parts of the upper and lower orientation films "F" and "F" on the right side of the inner member "IP" are rubbed from the left to the right; the parts of the upper and lower orientation films "F" and "F" on the left side of the inner member "IP," from the right to the left.

Accordingly, the liquid crystal "LC" is twisted by 180° between the upper and lower wall surfaces "B" and "B" and the ends of molecules "m" of liquid crystal "LC" on the downstream sides of rubbing are pulled away from the upper and lower orientation films "F" and "F."

The wall surfaces "B" and "B" do not need to be fitted with orientation films "F" if rubbing-less treatment is made to the wall surfaces "B" and "B."

Besides, the twist angle of the liquid crystal "LC" between the wall surfaces "B" and "B" is not limited to 180°, but may be any value so long as a flow of the liquid crystal "LC" toward the inner member "IP" is generated.

A pair of electrodes "E" and "E" is fitted on the wall surfaces "B" and "B," under the orientation films "F" and "F," on either side of the inner member "IP." The two electrodes "E" and "E" on either side of the inner member "IP" are so disposed that the direction of electric force will be perpendicular to the wall surfaces "B" and "B." The electrodes "E" and "E" on either side of the inner member "IP" are connected to a controller "D" with a power supply.

A changeover switch "SW" is provided between the two pairs of electrodes "E." The changeover switch "SW" has three positions; one connecting the controller "D" to the right electrodes "E" and "E," one connecting the controller "D" to the left electrodes "E" and "E," and a neutral position connecting the controller "D" to no electrode.

Accordingly, when the controller "D" is connected to the electrodes "E" and "E" on one side of the inner member "IP" and applies voltage to the electrodes "E" and "E," formed between the electrodes "E" and "E" is an electric field "ef" whose direction of electric force is perpendicular to the wall surfaces "B" and "B." The right and left pairs of electrodes "E," the pair of orientation films "F" and "F," the changeover switch "SW," and the controller "D" constitute the means for turning the molecules of liquid crystal mentioned in the claims of the present invention.

The two electrodes "E" and "E" on either side of the inner member "IP" do not need to be so disposed that the direction of electric force will be perpendicular to the wall surfaces "B" and "B." They may be disposed in any other way so long as they form an electric field "ef" between them to turn the molecules "m" of liquid crystal "LC" in a plane intersecting one of the two wall surfaces "B" and "B."

Besides, the four electrodes "E" may be fitted on the outside of the outer member "L." In this case, an electric field "ef" can be formed between the two wall surfaces "B" and "B" if the outer member "L" is made of a conductive material or a material which the lines of electric force can penetrate.

Accordingly, when the changeover switch "SW" connects the controller "D" to the right electrodes "E" and "E" and the controller "D" applies voltage to the electrodes "E" and "E," the part of liquid crystal "LC" on the right side of the inner member "IP" flows to the left, pushing the inner member "IP" to the left. The part of liquid crystal "LC" on the left side of the inner member "IP" moves through the channel "CP" to the right side of the inner member "IP." Thus, the inner member "IP" is moved to the left.

When the changeover switch "SW" is switched to connect the controller "D" to the left electrodes "E" and "E" and the controller "D" applies voltage to the electrodes "E" and "E," the part of liquid crystal "LC" on the left side of the inner member "IP" pushes the inner member "IP" to the right. The part of liquid crystal "LC" on the right side of the inner member "IP" moves through the channel "CP" to the left side of the inner member "IP." Thus, the inner member "IP" is moved to the right.

Thus, by switching the changeover switch "SW," the inner member "IP" can be moved to the right and left.

With the liquid crystal motor of the third embodiment, the inner member "IP" is moved to the right and left along the wall surfaces "B" and "B" by switching the changeover switch "SW."

If the molecules "m" of liquid crystal "LC" are arranged symmetrically with respect to the inner member "IP," the forces pushing the inner member "IP" from the right and left sides can be made equal to each other; accordingly, the inner member "IP" can stably be moved and returned to its original position.

If the controller "D" applies pulse-like voltage to a pair of electrodes "E" and "E," the inner member "IP" is moved intermittently. Besides, by changing the time intervals of pulses, or the time intervals of application of an electric field, the flow rate of liquid crystal "LC" can be changed. Moreover, by shortening the time intervals of application of an electric or magnetic field, a more continuous liquid-crystal flow can be achieved.

If the changeover switch "SW" is switched repeatedly to apply voltage to the right and left electrodes "E" alternately, the inner member "IP" is vibrated to the right and left.

Although the molecules "m" of liquid crystal "LC" are arranged so as to pull their ends distant from the inner member "IP" away from the orientation films "F" and "F," they may be arranged so as to pull their ends near the inner member "IP" away from the orientation films "F" and "F." In this case, when the controller "D" is connected to the right electrodes "E" and "E" and voltage is applied to them, the part of liquid crystal "LC" on the right side of the inner member "IP" flows to the right to move through the channel "CP" to the left side of the inner member "IP." Thus, the inner member "IP" is pushed and moved to the right. When the controller "D" is connected to the left electrodes "E" and "E" and voltage is applied to them, the part of liquid crystal "LC" on the left side of the inner member "IP" moves through the channel "CP" to the right side of the inner member "IP." Thus, the inner member "IP" is pushed and moved to the left.

With the above configuration, the object-moving mechanisms of the present invention can be applied as follows.

With the above configuration, the liquid crystal motor of the present invention can be applied as follows.

The liquid crystal motor of the first embodiment can be applied to conveying devices, which can be very compact and driven by very small electric power; therefore, they can be applied to working machines accompanying micro-machines and so on.

The liquid crystal motor of the second embodiment can be applied to motors, drills which automatically moves axially, and cutter blades which rotate about their axes. Such motors can be very compact and driven by very small electric power; therefore, they can be applied to drive units of micro-machines and so on.

The liquid crystal motor of the third embodiment can be applied to actuators, which can be very compact and driven by very small electric power; therefore, they can be applied to working machines accompanying micro-machines and so on.

Because the liquid crystal "LC" in the liquid crystal motors of the first, second, and third embodiments is caused to flow by very small electric power, the liquid crystal motors can be applied to sensors which sense a magnetic or electric field caused by a very small current.

Next, the result of calculation of flow rates of liquid crystal "LC" along the z- and x-axes as shown in FIGS. 1 and 2 in the case that liquid crystal "LC" is put between upper and lower infinite flat plates and a magnetic field whose direction of magnetic force is perpendicular to the infinite flat plates is applied to the infinite flat plates.

Used for the calculation was the Leslie-Ericksen theory which was developed based on the continuum theory in 1968. The finite difference method was used for discretization. Runge-Kutta method was used for the integration of time. FORTRAN and an EWS were used. Conditions for the calculation were as follows.

Distance between two parallel flat plates: 1 mm

Number of meshes: 100

Time step: $10^{-7}$ seconds

Intensity of magnetic field: 45 Zöcher number defined by expression below)

$$\text{Zöcher number} = LH\sqrt{\Delta\chi/K_1}$$

where L is the distance between the two parallel flat plates; H, the intensity of the magnetic field; $\Delta\chi$, the anisotropy of magnetic susceptibility; and $K_1$, Frank elastic constant for splay mode.

Twist angle of liquid crystal: 0-540°

Liquid crystal: p-azoxyanisole (PAA)

When the twist angle is 180°, the molecules of the liquid crystal are arranged between the infinite flat plates as shown in FIGS. 1 and 2.

Figure 8:
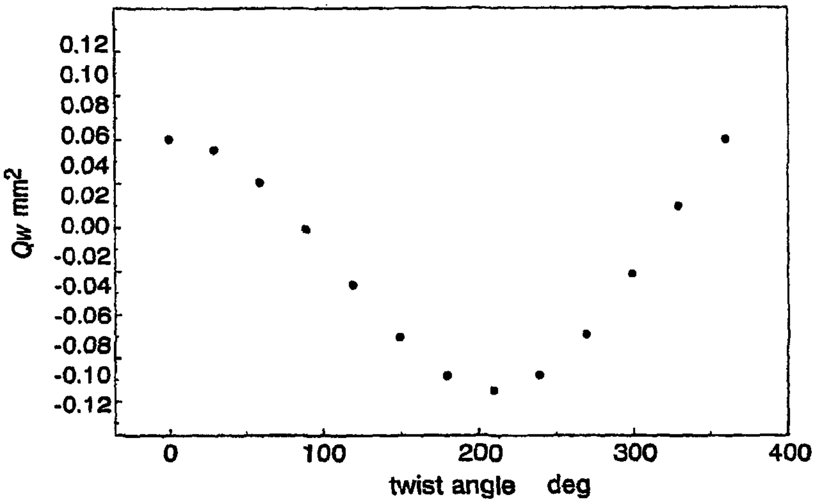
FIG. 8(A) shows the relationship between the twist angle and the flow rate along the z-axis.
FIG. 8(B), the relationship between the twist angle and the flow rate along the x-axis.
FIG. 8(C), the relationship between the twist angle and the angle of the flow with the plus segment of the z-axis.
Figure 8:
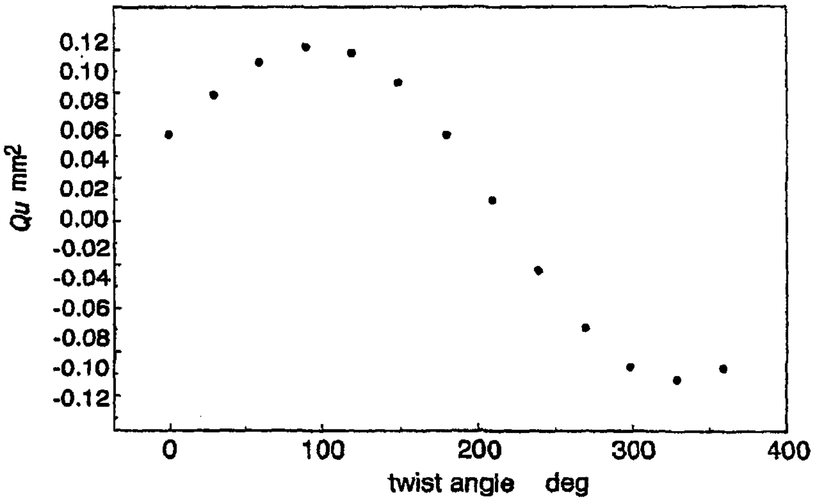
Figure 8:
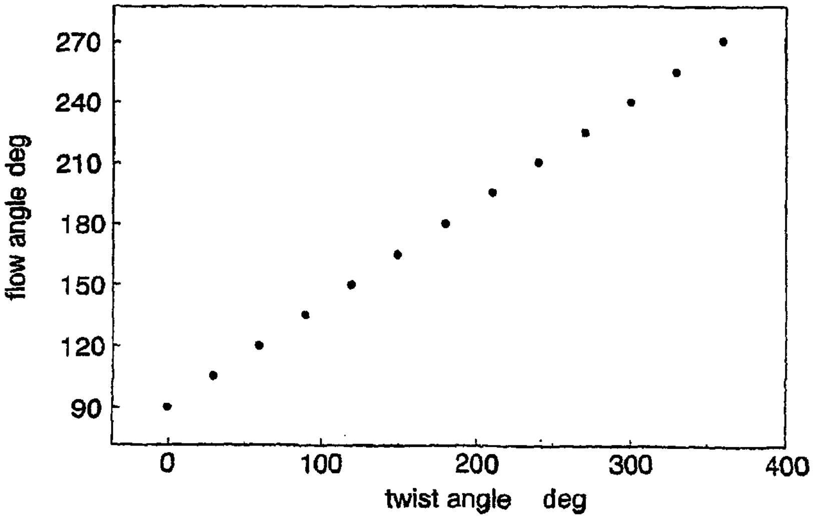
Figure 9:
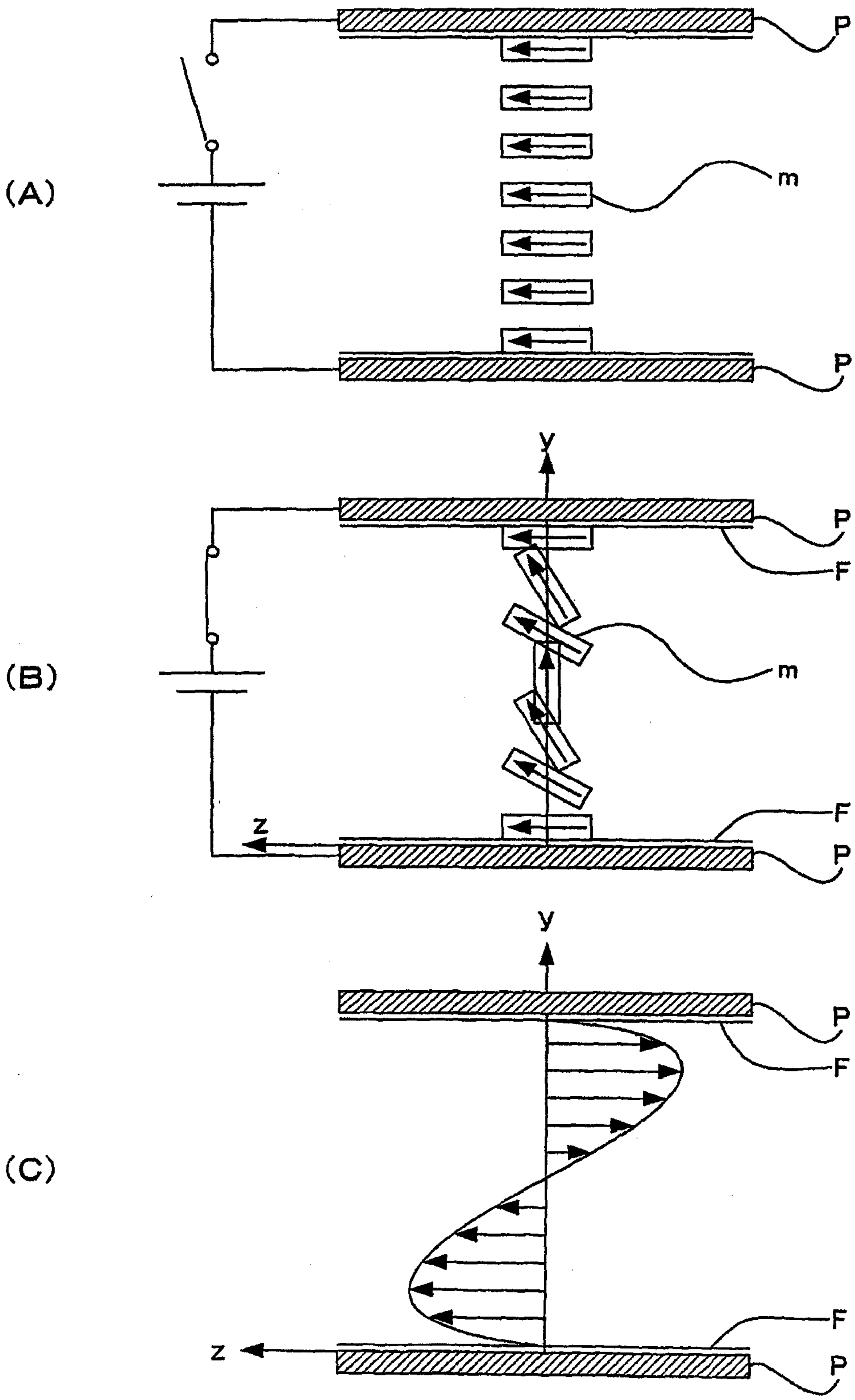
FIG. 9 is an illustration of the motion of molecules of the liquid crystal when an electric field is applied to liquid crystal.

FIG. 8(A) shows the relationship between the twist angle and the flow rate along the z-axis; FIG. 8(B), the relationship between the twist angle and the flow rate along the x-axis; FIG. 8(C), the relationship between the twist angle and the angle of the flow with the plus segment of the z-axis. As shown in FIG. 8(A), as the twist angle changes from 0° on, the liquid crystal flows in the minus direction along the z-axis (to the right in FIG. 1) and the flow rate reaches its peak about 200°. It is shown that the liquid crystal invariably flows in the minus direction along the z-axis. Thus, it was ascertained that the liquid crystal flows in the minus direction along the z-axis (to the right in FIG. 1) under the conditions described above.

On the other hand, as the twist angle changes from 0° on, the liquid crystal first flows in the plus direction along the x-axis (to the left in FIG. 2) and the flow rate reaches its peak about 90°. The flow rate becomes zero at 180° and the liquid crystal flows in the minus direction along the x-axis over 180°. Thus, it was ascertained that the liquid crystal can be caused to flow in either direction along the x-axis by changing the twist angle under the conditions described above.

As shown in FIG. 8(C), when the twist angle is zero, the flow rates along the x- and z-axes are zero. If the liquid crystal is twisted counterclockwise by any angle at all, there occurs a flow of which the flow rates along the x- and z-axes are not zero. As the twist angle increases, the counterclockwise angle of the direction of the flow with the plus segment of the z-axis increases proportionately. When the twist angle is 180°, the angle of the direction of the flow with the plus segment of the z-axis is 180°, the liquid crystal "LC" flowing in the minus direction along the z-axis. When the twist angle is 360°, the angle of the direction of the flow with the plus segment of the z-axis is 270°, the liquid crystal "LC" flowing in the minus direction along the x-axis. Namely, by twisting the liquid crystal "LC" clockwise or counterclockwise, the direction of the flow of liquid crystal "LC" can be changed in a range of 360° from the z-axis.

Thus, by adjusting the twist angle of liquid crystal "LC," the liquid crystal "LC" can be caused to flow in any desired direction in the plane containing the x- and z-axes between the two infinite flat plates.

With the mechanism and the method for causing flow of liquid crystal according to the present invention, industrially utilizable flows of liquid crystal in a channel can be generated. The liquid crystal motor according to the present invention can be applied to actuators to be used as motive-power sources for micro-machines, etc. and sensors for sensing minute movement.

What is claimed is:

1. A liquid crystal motor comprising:

an outer member which has a space in it;

a shaft which is put in the space for free rotation;

liquid crystal which is put between the inside surface of the outer member and the surface of the shaft; and a means for applying a radial electric field to the molecules of the liquid crystal to turn them in a plane intersecting the axis of the shaft, the means including:

a pair of electrodes, one being fitted to the outer member, the other being fitted to the shaft; and a sub-means which is fitted onto the outer member and the shaft and restricts the molecules of the liquid crystal so that they will turn in one and the same direction to form a circulating flow around the center axis of the shaft.

2. The liquid crystal motor of claim 1 wherein:

the sub-means has an orientation film laid on the inside surface of the outer member and an orientation film laid on the surface of the shaft;

the orientation film of the outer member is rubbed in the direction at an angle with the axis of the shaft; and the orientation film of the shaft is rubbed in the direction at an angle with the axis of the shaft.

3. The liquid crystal motor of claim 1 wherein the sub-means twists the liquid crystal between the inside surface of the outer member and the surface of the shaft.

4. The liquid crystal motor of claim 1 wherein:

the means includes a controller to control the timing in applying an electric or magnetic field to the liquid crystal and the intensity of the electric or magnetic field; and the controller applies an electric or magnetic field to the liquid crystal intermittently.

5. A liquid crystal motor comprising:

an outer member which has a space in it;

a shaft which is put in the space for free rotation;

liquid crystal which is put between the inside surface of the outer member and the surface of the shaft; and a means for applying a radial magnetic field to the molecules of the liquid crystal to turn them in a plane intersecting the axis of the shaft, the means including:

a pair of magnetic poles, one being fitted to the outer member, the other being fitted to the shaft; and a sub-means which is fitted onto the outer member and the shaft and restricts the molecules of the liquid crystal so that they will turn in one and the same direction to form a circulating flow around the center axis of the shaft.

6. The liquid crystal motor of claim 5 wherein:

the sub-means has an orientation film laid on the inside surface of the outer member and an orientation film laid on the surface of the shaft;

the orientation film of the outer member is rubbed in the direction at an angle with the axis of the shaft; and the orientation film of the shaft is rubbed in the direction at an angle with the axis of the shaft.

7. The liquid crystal motor of claim 5 wherein the sub-means twists the liquid crystal between the inside surface of the outer member and the surface of the shaft.

8. The liquid crystal motor of claim 5 wherein:

the means includes a controller to control the timing in applying an electric or magnetic field to the liquid crystal and the intensity of the electric or magnetic field; and the controller applies an electric or magnetic field to the liquid crystal intermittently.

* * * * *